Oct. 8, 1963     H. M. LUCAS     3,106,251
ELECTRIC LAWN EDGER
Filed Sept. 29, 1961
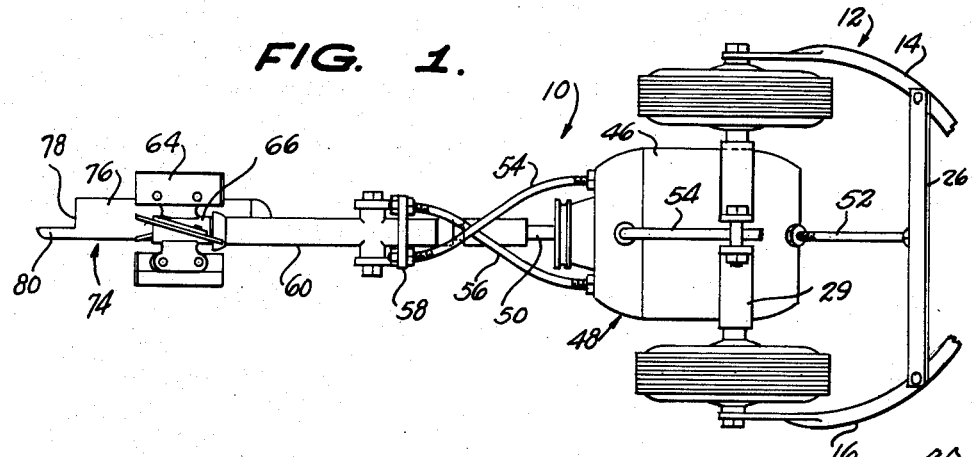
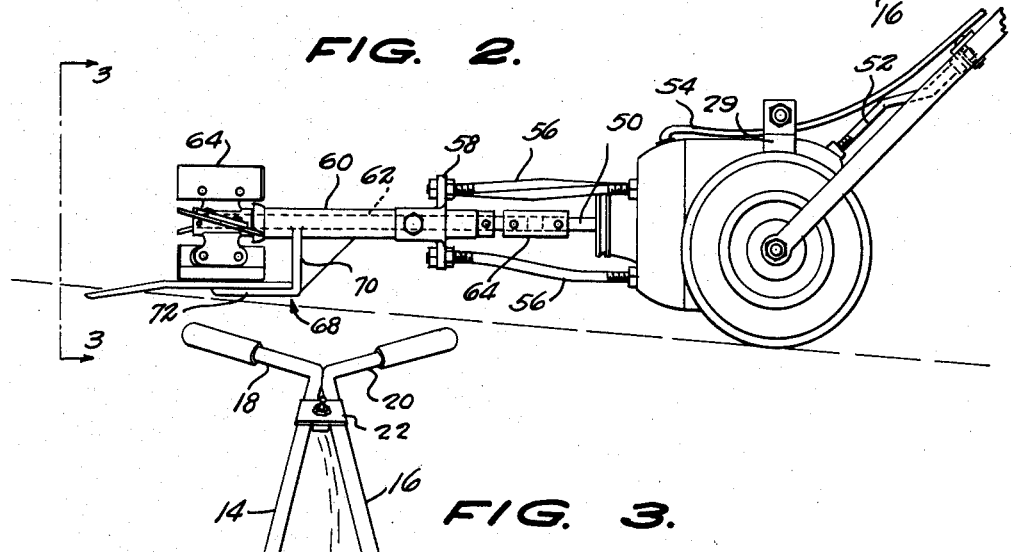
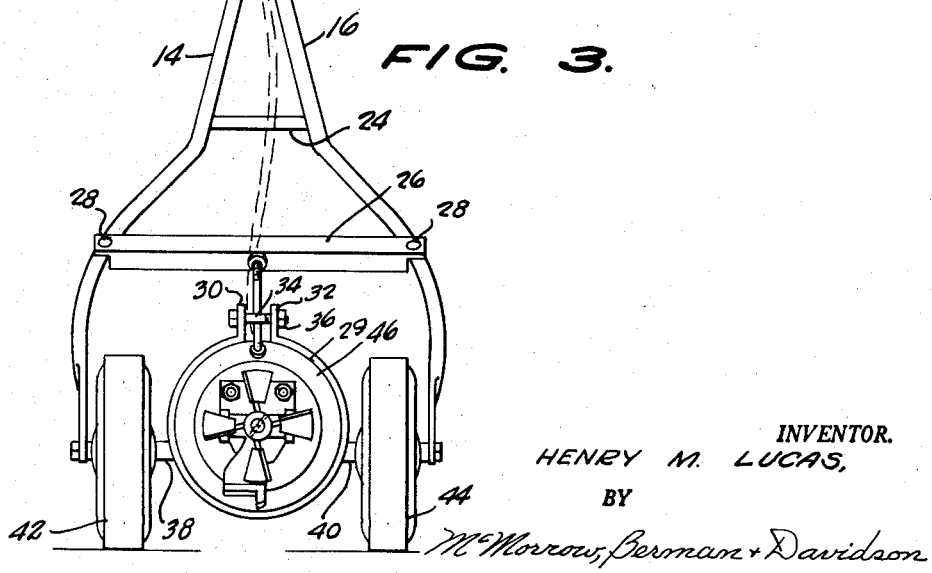
INVENTOR.
HENRY M. LUCAS,
BY
McMorrow, Berman & Davidson
ATTORNEYS.

3,106,251
ELECTRIC LAWN EDGER
Henry M. Lucas, 9437 Hickory St., Norfolk, Va.
Filed Sept. 29, 1961, Ser. No. 141,757
1 Claim. (Cl. 172—16)

The instant invention pertains to the general class of power-operable tools adapted for use in connection with the cutting, trimming and/or edging of lawns.

One of the primary objects of the instant invention is to provide a lawn edge trimmer which is powered through an electrical source and which does not depend for its operation on the rotation of ground-engaging wheels.

A further object of this invention is to provide a lawn edge trimmer which is highly efficient in operation and which requires small expenditures in energy to efficiently operate.

Another object of this invention is to provide a lawn edge trimmer of such construction as to permit the minimum damage of obstructions to the cutting blades.

It is still another object of this invention to provide a lawn edge trimmer with which the grass to be trimmed may be done so with the minimum expenditure of time and energy.

Still another object of the invention is to provide a lawn edge trimmer that will cut the lawn edge in an even and neat manner so as to provide, as a final result, a lawn which is aesthetically pleasing.

Still further, the instant invention pertains to a lawn edge trimmer wherein the trimmer is mechanically operable and is directly connected with the cutting means or trimming means without the use of intermediary belts, gears, et cetera.

Another object of this invention is to provide a lawn edge trimmer device which is composed of a very minimum number of parts.

This invention contemplates, as a still further object thereof, the provision of a lawn edging device which is non-complex in construction and assembly, inexpensive to manufacture and maintain, and which is durable in use.

Other and further objects and advantages of the instant invention will become more evident from a consideration of the following specification when read in the light of the annexed drawing, in which:

FIGURE 1 is a top plan view of a lawn edging device constructed in accordance with this invention;

FIGURE 2 is a side elevational view of the lawn edge trimmer shown in FIGURE 1; and FIGURE 3 is a front elevational view of the lawn edge trimmer illustrated in FIGURES 1 and 2.

Referring now more specifically to the drawing, reference numeral 10 designates, in general, a lawn edge trimmer constructed in accordance with the teachings of this invention. Basically, the lawn edge trimmer 10 is seen to comprise a frame 12 which includes a pair of elongated substantially hollow tubular side frame members 14, 16, having a substantially yoke-like configuration. The side frame members 14, 16, adjacent their respective points of convergence are bent to diverge away from one another in order to provide handles 18, 20, respectively. Immediately adjacent the point of convergence of the side frame members 14, 16 a conventional clamp 22 is provided to prevent the inadvertent lateral separation thereof. Intermediate their respective ends, the side frame members 14, 16 are provided with a substantially rectangular brace 24 which also serves to prevent the inadvertent separation of the side frame members 14, 16 and serves as a stabilizing device.

Adjacent the widest points of divergence of the side frame members 14, 16, an L-shaped angle iron 26 is provided, the same being connected to the side frame members 14, 16 by means of rivets 28 or other conventional fastening means.

Reference numeral 29 indicates a substantially cylindrical split clamp having tab ends 30, 32 at the terminal ends thereof. As is seen in FIGURE 3 of the drawing, the tab ends 30, 32 are disposed in substantially spaced, parallel and confronting relation, and are adapted to be secured together by means of a conventional bolt 34 and nut 36.

Projecting laterally from substantially diametrically-opposed points on the clamp 29 are a pair of axles 38, 40, the outer ends of the latter being adapted to be received at substantially the outermost ends of the side frame members 14, 16 at their respective maximum divergence. The construction is such that the side frame members 14, 16 may be freely rotated on the axles 38, 40 to accommodate the usage of the tool, as well as the height of the user thereof.

Also mounted on the axles 38, 40, and adjacent the outer extremities of the side frame members 14, 16, are a pair of ground-engaging wheels 42, 44.

The split clamp 29 is adapted to surround and hold the housing 46 of an electric motor 48. The electric motor 48 is provided with a direct drive shaft 50 which is, as will be explained below, connected with the lawn edge trimming and cutting mechanism. To further stabilize the position of the electric motor 48, a strut 52 extends between and is connected with the housing 46 and the L-shaped angle member 26. The motor 48 is energized via the cable 54 which is connected with a source of E.M.F.

Reference numerals 56, in the several views of the drawing, denote elongated twisted braces having one of their respective ends fixedly secured to the motor housing 46. The other of their respective ends are fixedly connected to a flange 58 formed at one end of a guide tube 60 for a driven shaft 62 (see FIGURE 2). The driven shaft 62 is journalled for rotation within the guide tube 60, and the innermost end thereof is connected to the drive shaft 50 of the electric motor 48 by means of a conventional coupler sleeve 64. The other or outer end of the driven shaft 62 is connected with lawn trimming or cutter blades 64 which project radially from a centrally-disposed hub 66.

The guide tube 60, adjacent the outer end thereof, is formed with a downwardly-depending L-shaped support arm 68, the support arm 68 including a foot portion 70 and a forwardly-projecting leg portion 72. Fixedly secured to the leg portion 72 is a longitudinally-extending, substantially rectangular cutter plate 74 which is designed to be tangenially engaged by the cutting blades 64. The plate 74, reference being made to FIGURES 1 and 2 of the drawing, projects well beyond the cutter blades 64 and has a downwardly-bent end portion 76 which is notched as at 78 to form a ground-engaging or gouging tine 80.

Having described and illustrated one embodiment of this invention in detail, the operation of the same is deemed to be self-evident. To utilize this tool, it is only necessary that the cable 54 be plugged into a source of electrical energy (not shown) to cause the motor 48 to be energized. Energization of the motor causes, of course, rotation of the drive shaft 50 which, in turn, imparts a similar movement to the driven shaft 62 via the couple sleeve 64. The driven shaft 62 forces rotation of the cutting blades 64 to effect a grass-shearing operation in conjunction with the cutter blade 74. The operator superimposes the end portion 76 of the cutter blade 74 on the sidewalk, and due to the angle of inclination of the tine 80, the latter will engage below the ground surface and form a groove therein immediately adjacent the sidewalk while, at the same time, the grass adjacent the sidewalk is being cut. The result is a neatly trimmed lawn without having blades of grass overhanging the sidewalk.

It is to be understood that the embodiment of this invention described and illustrated herein is offered merely by way of example, and that the scope of this invention is to be limited only by the appended claim.

What is claimed is:

An electric lawn edging device comprising a yoke-shaped frame including a pair of oppositely-disposed confronting and diverging side frame members, said side frame members terminating at one of their respective ends in laterally and oppositely-bent handles, a substantially cylindrical split clamping ring disposed adjacent the other ends of said side frame members, the terminal ends of said ring being provided with offset tabs disposed in spaced and substantially parallel relationship, means extending between and connecting together said tabs to effect a tightening of said ring as said tabs are drawn together, said clamping ring being adapted to surround and hold the housing of an electric motor, said motor having a drive shaft projecting therefrom, said clamping ring having axles projecting laterally from the opposed sides thereof, said axles being supported on said side frame members adjacent their respective other ends, a wheel rotatably supported on each of said axles, an elongated guide tube having an outwardly-extending flange at one end thereof, means connected with said motor housing and said flange for supporting said guide tube in coaxial relation relative to said drive shaft, a driven shaft disposed for rotation within said guide tube, means for connecting said drive shaft with one end of said driven shaft, a plurality of cutting blades fixedly secured to the other end of said driven shaft for rotation therewith, an L-shaped support arm depending from said guide tube, said support arm having a foot portion disposed substantially perpendicular to the axis of said driven shaft and a leg portion having a longitudinal axis extending substantially parallel to the axis of said driven shaft, a cutter plate having a substantially rectangular configuration fixedly secured to said leg portion of said support arm and disposed immediately adjacent said cutting blades for tangential engagement therewith to effect a shearing operation therebetween, and said cutter plate having a longitudinally-extending tine on one side thereof depressed beneath the plane of said cutter blades.

References Cited in the file of this patent
UNITED STATES PATENTS

| | | |
|---|---|---|
| Re. 21,274 | Orr | Nov. 21, 1939 |
| Re. 24,729 | Sturgis | Oct. 27, 1959 |
| 1,460,261 | Martin | June 26, 1923 |
| 2,480,944 | Malpass | Sept. 6, 1949 |
| 2,491,824 | McKee | Dec. 20, 1949 |
| 2,496,022 | Remonte | Jan. 31, 1950 |
| 2,559,842 | Bannister | July 10, 1951 |
| 2,876,850 | Starrett | Mar. 10, 1959 |